United States Patent
Balchandran et al.

(10) Patent No.: US 9,384,190 B2
(45) Date of Patent: *Jul. 5, 2016

(54) METHOD AND SYSTEM FOR CONVEYING AN EXAMPLE IN A NATURAL LANGUAGE UNDERSTANDING APPLICATION

(71) Applicant: Nuance Communications, Inc., Burlington, MA (US)

(72) Inventors: Rajesh Balchandran, Verona, WI (US); Linda M. Boyer, Ossining, NY (US); James R. Lewis, Delray Beach, FL (US); Brent D. Metz, New York, NY (US)

(73) Assignee: Nuance Communications, Inc., Burlington, MA (US)

( * ) Notice: Subject to any disclaimer, the term of this patent is extended or adjusted under 35 U.S.C. 154(b) by 130 days.

This patent is subject to a terminal disclaimer.

(21) Appl. No.: 14/088,858

(22) Filed: Nov. 25, 2013

(65) Prior Publication Data

US 2014/0156265 A1   Jun. 5, 2014

Related U.S. Application Data

(63) Continuation of application No. 11/300,799, filed on Dec. 15, 2005, now Pat. No. 8,612,229.

(51) Int. Cl.
*G10L 15/00* (2013.01)
*G10L 15/18* (2013.01)
(Continued)

(52) U.S. Cl.
CPC ............. *G06F 17/28* (2013.01); *G10L 15/18* (2013.01); *G10L 15/183* (2013.01); *H04M 3/4936* (2013.01); *H04M 2203/2061* (2013.01)

(58) Field of Classification Search
CPC ..... G10L 15/197; G10L 15/22; G10L 15/063; G10L 15/18; G10L 15/065; G10L 2015/0635; G06F 17/2715; G06F 17/2765; G06F 17/30696; G06N 99/005
See application file for complete search history.

(56) References Cited

U.S. PATENT DOCUMENTS 5,386,556 A   1/1995   Hedin et al.
5,633,909 A   5/1997   Fitch
(Continued)

FOREIGN PATENT DOCUMENTS

JP   2000250913 A   9/2000

OTHER PUBLICATIONS

Ballard et al., A Phrase-Structured Grammatical Framework for Transportable Natural Language Processing. Comp Ling. Apr.-Jun. 1984;10(2):81-96.

(Continued)

*Primary Examiner* — Michael Ortiz Sanchez
(74) *Attorney, Agent, or Firm* — Wolf, Greenfield & Sacks, P.C.

(57) ABSTRACT

A method (300) and system (100) is provided to add the creation of examples at a developer level in the generation of Natural Language Understanding (NLU) models, tying the examples into a NLU sentence database (130), automatically validating (310) a correct outcome of using the examples, and automatically resolving (316) problems the user has using the examples. The method (300) can convey examples of what a caller can say to a Natural Language Understanding (NLU) application. The method includes entering at least one example associated with an existing routing destination, and ensuring an NLU model correctly interprets the example unambiguously for correctly routing a can to the routing destination. The method can include presenting the example sentence in a help message (126) within an NLU dialog as an example of what a caller can say for connecting the caller to a desired routing destination. The method can also include presented a failure dialog for displaying at least one example that failed to be properly interpreted to ensure that ambiguous or incorrect examples are not presented in a help message.

7 Claims, 3 Drawing Sheets

(51) Int. Cl.

| | |
|---|---|
| *G10L 21/00* | (2013.01) |
| *G10L 25/00* | (2013.01) |
| *G06F 17/28* | (2006.01) |
| *G10L 15/183* | (2013.01) |
| *H04M 3/493* | (2006.01) |

(56) References Cited

U.S. PATENT DOCUMENTS

| | | | |
|---|---|---|---|
| 5,794,189 A * | 8/1998 | Gould | 704/231 |
| 5,870,464 A | 2/1999 | Brewster et al. | |
| 5,915,011 A | 6/1999 | Miloslavsky | |
| 6,064,957 A * | 5/2000 | Brandow et al. | 704/235 |
| 6,151,575 A | 11/2000 | Newman et al. | |
| 6,269,153 B1 | 7/2001 | Carpenter et al. | |
| 6,285,978 B1 | 9/2001 | Bernth et al. | |
| 6,393,388 B1 | 5/2002 | Franz et al. | |
| 6,606,598 B1 | 8/2003 | Holthouse et al. | |
| 6,629,066 B1 | 9/2003 | Jackson et al. | |
| 6,668,056 B2 | 12/2003 | Rupe et al. | |
| 6,735,563 B1 * | 5/2004 | Bi | 704/241 |
| 6,751,591 B1 * | 6/2004 | Gorin et al. | 704/257 |
| 6,925,432 B2 | 8/2005 | Lee et al. | |
| 7,027,586 B2 | 4/2006 | Bushey et al. | |
| 7,092,888 B1 | 8/2006 | McCarthy et al. | |
| 7,117,447 B2 | 10/2006 | Cobb et al. | |
| 7,249,011 B2 | 7/2007 | Chou et al. | |
| 7,295,981 B1 | 11/2007 | Gupta et al. | |
| 7,346,507 B1 | 3/2008 | Natarajan et al. | |
| 7,472,060 B1 * | 12/2008 | Gorin et al. | 704/240 |
| 7,620,550 B1 | 11/2009 | Gupta et al. | |
| 7,643,998 B2 | 1/2010 | Yuen et al. | |
| 7,751,552 B2 | 7/2010 | Bushey et al. | |
| 8,073,699 B2 | 12/2011 | Michelini et al. | |
| 2002/0032564 A1 * | 3/2002 | Ehsani et al. | 704/235 |
| 2002/0077823 A1 | 6/2002 | Fox et al. | |
| 2002/0116174 A1 | 8/2002 | Lee et al. | |
| 2002/0128821 A1 * | 9/2002 | Ehsani et al. | 704/10 |
| 2002/0169595 A1 * | 11/2002 | Agichtein et al. | 704/9 |
| 2002/0181689 A1 | 12/2002 | Rupe et al. | |
| 2003/0105634 A1 | 6/2003 | Abella et al. | |
| 2003/0225578 A1 | 12/2003 | Kahn et al. | |
| 2003/0225719 A1 * | 12/2003 | Juang et al. | 706/48 |
| 2004/0030541 A1 | 2/2004 | Chou et al. | |
| 2005/0135595 A1 | 6/2005 | Bushey et al. | |
| 2005/0159957 A1 * | 7/2005 | Roth et al. | 704/276 |
| 2006/0069569 A1 | 3/2006 | Knott et al. | |
| 2006/0098803 A1 | 5/2006 | Bushey et al. | |
| 2006/0140357 A1 | 6/2006 | Gomez et al. | |
| 2006/0143015 A1 | 6/2006 | Knott et al. | |
| 2006/0195321 A1 | 8/2006 | Deligne et al. | |
| 2006/0235691 A1 * | 10/2006 | Tomasic et al. | 704/257 |
| 2007/0143099 A1 | 6/2007 | Balchandran et al. | |
| 2007/0219798 A1 | 9/2007 | Wang et al. | |
| 2009/0125461 A1 * | 5/2009 | Qi et al. | 706/12 |

OTHER PUBLICATIONS

Berger et al., A Maximum Entropy Approach to Natural Language Processing. Assoc Comput Ling. 1996;22(1):39-71.

Chelba et al., Discriminative Training of N-Gram Classifiers for Speech and Text Routing. Eurospeech 2003. Sep. 2003;2777-80.

Chen et al., An Empirical Study of Smoothing Techniques for Language Modeling. Tech Rep TR-10-98. Center for Research in Computing Technology, Harvard University. 1998;310-8.

Gauvain et al., MAP Estimation of Continuous Density HMM: Theory and Applications. Proc DARPA Speech Nat Lang. Feb. 1992;1-6.

Gauvain et al., Maximum a Posteriori Estimation for Multivariate Gaussian Mixture Observations of Markov Chains. IEEE Trans Speech Audio Proc. Apr. 1994;2(2):291-8.

Goel, Conditional Maximum Likelihood Estimation for Improving Annotation Performance of N-Gram Models Incorporating Stochastic Finite State Grammars. Proc ICSLP 2004. 2004. 4 pgs.

Gopalakrishnan et al., An Inequality for Rational Functions with Application to Some Statistical Estimation Problems. IEEE Trans Info Theory. Jan. 1991;37(1):107-13.

Juang et al., Minimum Classification Error Rate Methods for Speech Recognition. IEEE Trans Speech Audio Proc. May 1997;5(3):257-65.

Katagiri et al., Pattern Recognition Using a Family of Design Algorithms Based upon the Generalized Probabilistic Descent Method. Proc IEEE. Nov. 1998;86(11):2345-73.

Kuo et al., Discriminative Training of Language Models for Speech Recognition. Proc ICASSP 2002. 2002;I-325-I-328.

Kuo et al., Discriminative Training of Natural Language Call Routers. IEEE Trans Speech Audio Proc. Jan. 2003;11(1):100-9.

Mangu et al., Finding Consensus in Speech Recognition: Word Error Minimization and Other Application of Confusion Networks. Comp Speech Lang. Oct. 2000;14(4):373-400.

McRoy et al., Creating Natural Language Output for Real-Time Applications. Intellig. 2001;21-34.

Riccardi, Language Model Adaptation for Spoken Language Systems. Proc ICSLP 1998. 1998. 4 pgs.

Roark et al., Corrective Language Modeling for Large Vocabulary ASR with the Perceptron Algorithm. IEEE ICASSP 2004. 2004;I-749-I-752.

Souvignier et al., Online Adaptation for Language Models in Spoken Dialogue System. Proc ICSLP 1998. 1998. 4 pgs.

Tur et al., Extending Boosting for Call Classification Using Word Confusion Networks. IEEE ICASSP 2004. 2004;I437-I440.

Tur et al., Improving Spoken Language Understanding Using Word Confusion Networks. Proc ICSLP 2002. 2002;1137-40.

Wang et al., Is Word Error Rate a Good Indicator for Spoken Language Understanding Accuracy. IEEE ASRU 2003. 2003;577-82.

Woodland et al., Large Scale Discriminative Training for Speech Recognition. Comp Speech Lang. 2002;16:25-47.

* cited by examiner

METHOD AND SYSTEM FOR CONVEYING AN EXAMPLE IN A NATURAL LANGUAGE UNDERSTANDING APPLICATION

CROSS-REFERENCE TO RELATED APPLICATIONS

The present application claims the benefit under 35 U.S.C. §120 as a continuation of U.S. patent application Ser. No. 11/300,799, filed on Dec. 15, 2005 and entitled "METHOD AND SYSTEM FOR CONVEYING AN EXAMPLE IN A NATURAL LANGUAGE UNDERSTANDING APPLICATION," which application is hereby incorporated herein by reference in its entirety.

BACKGROUND

1. Field of the Invention

The present invention relates to the field of natural language understanding (NLU) and, more particularly, to a method and system to facilitate user interaction in an NLU application.

2. Description of the Related Art

Natural Language Understanding (NLU) systems have been increasingly utilized for interfacing with software applications, customer support systems, embedded devices, and voice interactive based machines. Most NLU systems are employed to interact with a user, to receive text or voice, and to determine what the user desires the machine to accomplish. NLU systems can interpret a text or spoken utterance for performing a programmatic action. Typically, a user speaks into the device or machine and the NLU application performs a responsive action. For example, the NLU application can interpret a caller's request and identify the most appropriate destination to route the caller to by recognizing content within the spoken request.

Callers often have difficulty using an NLU application because the caller may not know what word should be spoken to the application. The caller can become frustrated when the NLU application misinterprets the caller's request and routes the caller to an incorrect destination, or simply does not process or respond to the caller's request. Accordingly, the user may not have a satisfactory experience with the NLU application. To improve understanding performance, the NLU system can employ domain specific vocabularies to process a caller request for routing a caller to a destination. A different NLU system can be used for different applications such as airline reservations, car rentals, hotel reservations, and other service based inquiry systems. The NLU system can recognize phrases particular to a certain terminology or field. Accordingly, the NLU system can be trained to interpret certain phrases to improve interpretation performance. The NLU system can be trained for specific phrases and sentences that are more representative of the requests callers may typically have with the service offering.

Currently, developing a NLU system is a mostly manual process in which statistical models are built from a corpus of user utterances that represent what a caller might say in response to the system prompts. As part of the development of these types of applications, developers may make decisions about examples of legitimate utterances that can be presented to callers in help prompts messages. However, the sentences selected by developers to present in the help prompts may be ambiguously interpreted or completely misinterpreted by the NLU statistical models with a consequence that the NLU application may not associate the sentences with the correct response to a caller's question or statement. Accordingly, the NLU application's ability to correctly process a caller's request depends on the content and relevance of the sentences the developer entered into the NLU database during development. A high level of substantive content within the example sentences can, be required within an NLU system for the NLU application to correctly interpret spoken requests from the caller. In practice, the developer generally decides what sentences should be entered into the NLU database prior to knowing the target NLU application. The developer also typically provides many different examples in anticipation of generally spoken caller requests since the developer does not know what requests to expect.

It is very effective for applications to offer assistance to callers by providing examples phrases through help prompts or otherwise, that the caller can use to interact with the system. Presently, NLU application development environments provide little support for coming up with or knowing what phrases or sentences the NLU application is capable of processing. Currently, the design of caller examples and the validation of examples is a manual process that is poorly understood by developers and often overlooked in practice. Therefore, there is a need for developers to convey to callers of an NLU application examples of statements to facilitate a favorable and responsive interaction with the application, and a need to make it easy for developers to provide high-quality examples. By encouraging users to use examples provided by a developer, the developer can significantly improve the NLU system's usability.

SUMMARY OF THE INVENTION

The invention disclosed herein provides a method and system for interacting with a natural language understanding system (NLU). The method can include the steps of entering at least one example sentence during development of a natural language understanding (NLU) application, and conveying the example sentence. In one aspect, the example sentence is interpreted by an NLU model. The method can further include presenting the example sentence in a help message of the NLU application as an example of what to say to interact with the NLU application. The method can include presenting a failure dialog to the developer for displaying at least one example that failed to be properly interpreted.

Another aspect of the invention can include a system for creating a Natural Language Understanding (NLU) application. The system can include an example planner that prompts a developer for at least one example sentence, and a validation unit connected to the example planner to increase a likelihood that an NLU model correctly interprets the example sentence. The system can include a help message to present at least one example of what a caller can say to interact with the NLU application. The system can further include a failure dialog to the developer for displaying at least one example that failed to be properly interpreted.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
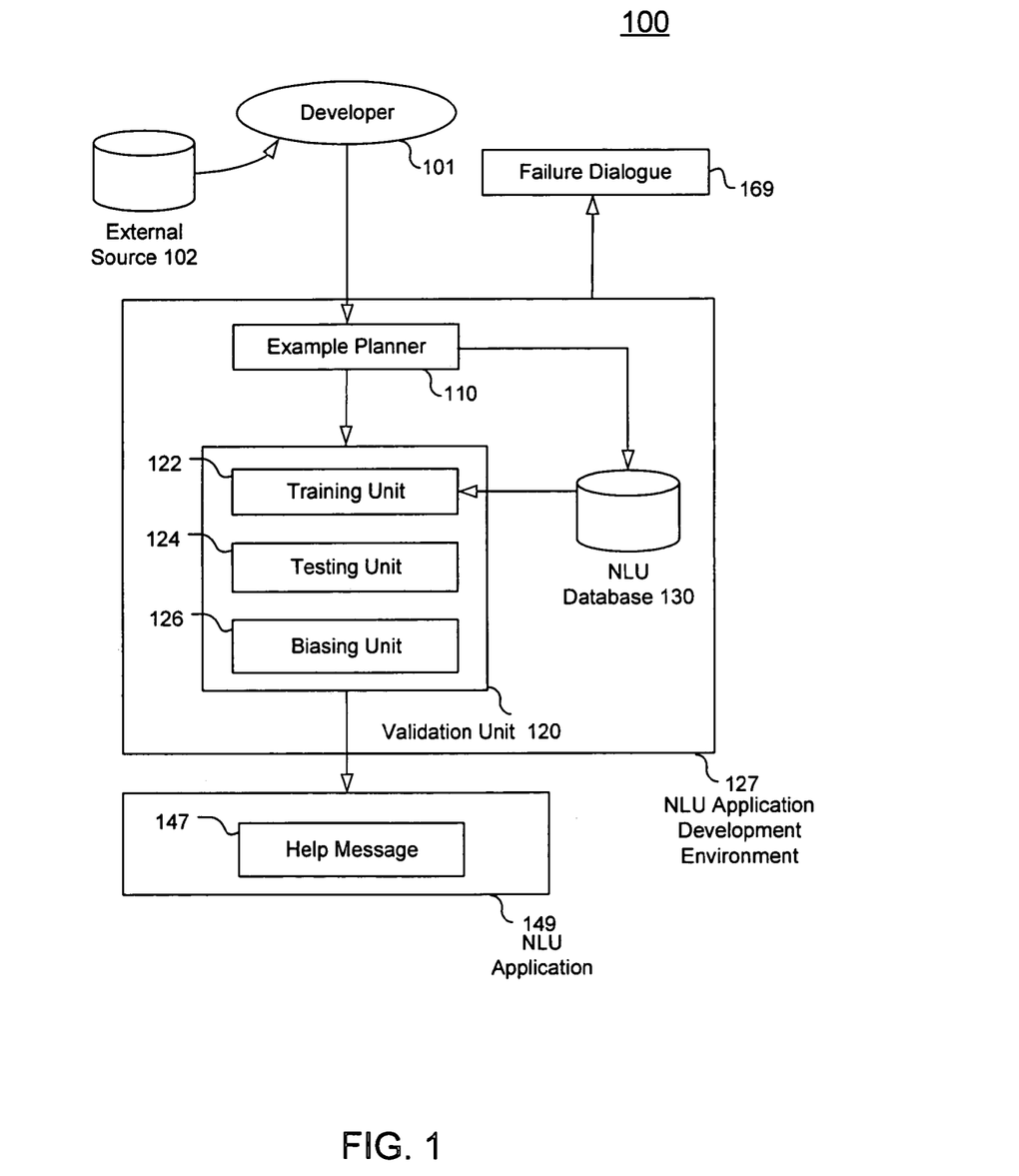
FIG. 1 is a schematic depiction of a system for creating and conveying an example prompt in accordance with an embodiment of the inventive arrangements disclosed herein.

FIG. 1 is a schematic diagram illustrating an NLU System 100 for creating and conveying an example within an NLU application development environment 127 in accordance with an embodiment of the inventive arrangements disclosed. The NLU System itself would itself work in conjunction with but not limited to a speech recognition system and Interactive Voice Response (IVR) platform (not shown in figure) for speech based interaction. Alternately, it could also be deployed but not limited to function in a text mode. The system 100 can include an external source 102, an example planner 110, a validation unit 120, and a help message 147. The help message 147 can be presented within the context of an NLU application dialogue 149. In one arrangement a failure dialogue 169 can be presented to the developer 101. The failure dialogue 169 can be presented for displaying at least one example that failed to be properly interpreted, and also presenting those example sentences that failed in a ranked order. The failure dialogue can help the developer recognize what examples the application is capable of correctly interpreting and help the developer introduce examples that achieve unambiguous and correct interpretation. The operative aspects of the embodiments of the invention are further described herein primarily in the context of performing call routing. The invention also has utility in many other contexts, such as handling financial and/or commercial transactions providing public services and other such voice-interactive functions.

A developer 101 can enter an example sentence from the external source 102 into the NLU application development environment 127 using the example planner 110. The external source 102 can be a text prompt for typing in example sentences, or it can be a database of available sentences. The example planner 110 can be a software interface or program component within the NLU application development environment 127. For example, the developer 101 can create or identify an example, such as a sentence or phrase using the external source 102, for association with a routing destination supported by the NLU application 149.

The developer 101 can select the example and enter the example into the example planner 110 under the corresponding routing destination. The NLU application development environment 127 can accordingly form an association between the example and the routing destination for configuring the validation unit 120 to correctly interpret the examples. The NLU application development environment 127 can present the help message 147 in the NLU application 149 for conveying the examples the developer submitted through the example planner 110 for presentation through the NLU application 149. The validation unit 120 can ensure that an NLU model within the NLU application can properly interpret the example, that is, associating the example with the (specified or expected) routing destination and thereby producing a correctly interpreted example. The help message 147 can present the example to a caller of the NLU application for conveying to the caller an example phrase or sentence that the caller can speak to the NLU application 149. The purpose of the example is to provide a subset of sentences that are representative of caller statements which cause the NLU application 149 to interpret them correctly and to route the caller to an appropriate routing destination. For example, the caller can receive a list of spoken examples from the help message 147 for making a selection. Alternatively, the caller can submit a spoken request not provided within the help message 147 which the NLU application can still properly interpret for routing the call to the correct destination. The validation unit 120 ensures the examples presented in the help message 147 are correctly interpreted by the NLU models for connecting the user to the correct routing destination.

In one arrangement, the example planner 110 can prompt a developer 101 to enter an example under a supported routing destination. The NLU application can already support various routing destinations. The developer 101 does not need to supply a routing destination and can enter the example under an already supported routing destination. The developer 101 can enter the example into the example planner 110 via text or voice. The validation unit 120 can process the example with the associated routing destination for forming an assignment between the example and the routing destination. During the creation of the NLU models the developer 101 can provide an example for an already supported routing destination. For example, the developer can enter the example "I want to buy a car" under the routing destination "sales". As another example, the developer can enter the example "I need credit" under the routing destination "finances". The developer enters examples that are generally related to the particular services that are within the scope of the NLU application being developed, typically choosing examples related to the more frequently requested services.

The examples can be presented to a user of the NLU application for conveying examples of what the user can say to the NLU application. A help message 147 can present examples for the user to hear. The user can repeat an example back or they can submit their own utterance during the interaction. The examples can be inserted into the help message 147 within an NLU application dialogue menu and presented to the caller during an NLU session. For instance, the help message can present one or more examples in a sentence frame like, "For example, you could say, 'I want to buy a car', 'I need an oil change', or 'I have a flat tire'." The NLU application can interpret the caller request and route the caller to the correct routing destination.

In one arrangement, the example planner 110 can be a graphical user interface or information window that can interface with the developer 101. The example planner 110 can provide an interface to the developer to enter examples from the external source 102. The example planner 110 can prompt a developer 101 to enter an example. The developer 101 can enter the example from the external source 102 by any suitable method which can include, without limitation, typing in the example or copying the example from a database. The example planner 110 can add the example and associated routing destination as a marked "example" sentence to the NLU database 130. The marked sentence can indicate a consideration priority during NLU model training, and can be marked with a count. The count denotes the frequency of occurrence for entering the example into the training unit 122. For example, certain examples can be given a higher count to emphasize a more frequent use and to give more weighting for purposes of strengthening an interpretation. The NLU database 130 can include a large number of marked examples that can be input to the NLU models within the NLU application 120. The validation unit 120 can take the marked examples provided by the developer 101 and ensure that the NLU models can properly interpret each example sentence. For example, within a call routing application, the proper interpretation is assignment to the correct routing destination. If the validation unit 120 cannot correctly interpret the routing destination from the example, the example sentence can be added to the NLU models and biased to ensure a high likelihood of correct interpretation after retraining the model.

The example planner 110 can also be cooperatively connected to the validation unit 120 for identifying the marked sentence within the NLU database 130. The validation unit 120 can perform the training of the NLU models, the testing of the NLU models, and the biasing of the NLU models. In one arrangement, the validation unit 120 can include a training unit 122 cooperatively connected to a testing unit 124 that is cooperatively connected to a biasing unit 126. The units 122, 124, and 126 can also be interconnected together. The training unit 122 can be coupled to the NLU sentence database 130 for updating a NLU model where the NLU sentence database 130 can include the example and routing destination. The testing unit 124 can evaluate the performance of NLU models with the marked sentences. The biasing unit 126 can tune the NLU models during training to associate routing destinations for correctly interpreting the examples. The NLU models can be but not limited to statistical models or grammars or language models. During the training of the NLU models, the validation unit 120 can automatically search for sentences marked as examples. The validation unit 120 can extract the sentence text and the routing destination from NLU database 130 and build NLU models with processing logic from the NLU application development environment 127.

The testing unit 124 can test the example sentences, compare the output of the NLU models from the example sentences, and determine if the output is the correct routing destination. If the output of the NLU model is not the expected routing destination, the training unit can automatically correct errors using available techniques, including but not limited to biasing the NLU models to the example sentences that failed by adding them to the training data, and restarting the training process. The validation unit 120 can further include an error resolution procedure that can repeat, in a looping fashion, until either all problems are resolved or a stop condition is reached. A stop condition can be, for example, a maximum number of iterations or a threshold ratio of corrected sentences to newly broken sentences.

Figure 2:
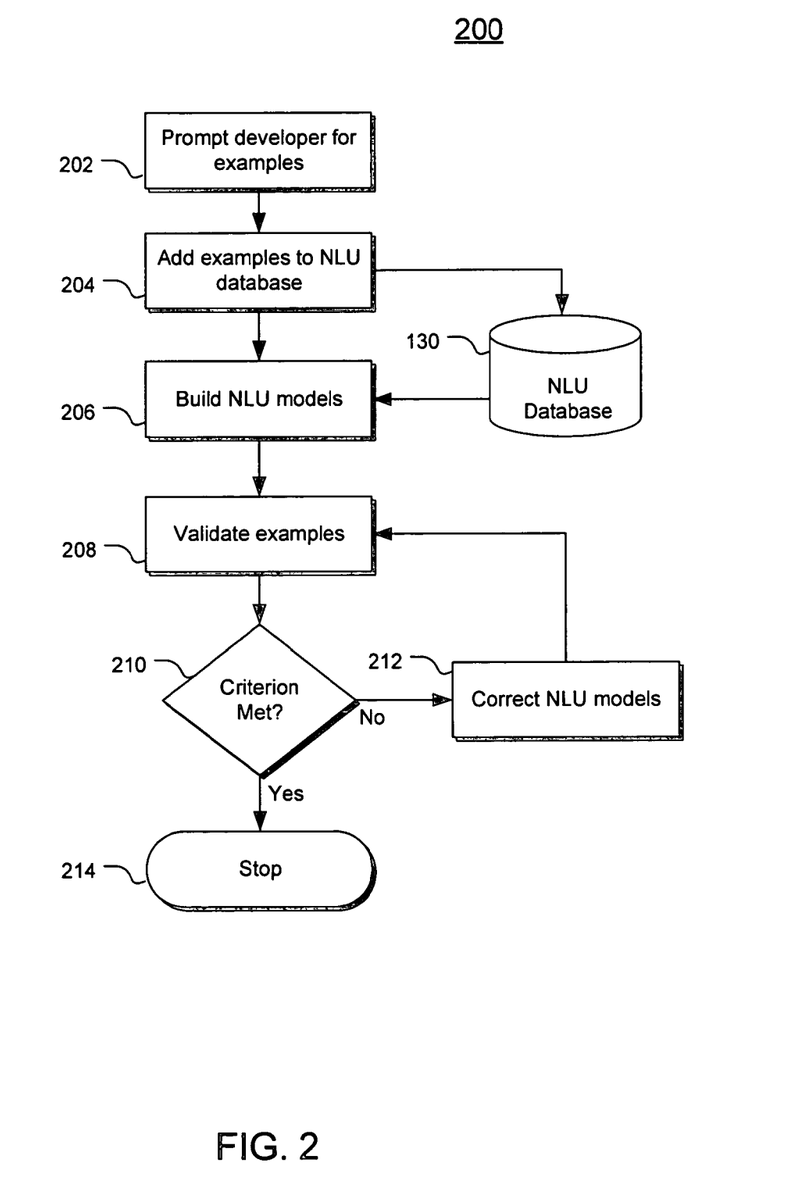
FIG. 2 is a flowchart for creating and conveying an example prompt in accordance with an embodiment of the inventive arrangements disclosed herein.

Referring to FIG. 2, a flowchart for creating an example prompt is shown. When describing the method 200, reference will be made to FIG. 1, although the method can be practiced in any other suitable device or system. At step 202, the system 100 can prompt the developer 101 for an example for a routing destination. The developer 101 can enter an example from the external source 102, which can be a sentence corpus. The example can be a sentence or phrase that the developer 101 associates with the routing destination. For example, a developer creates an NLU application to route calls received by an auto dealership. The calls can be routed to departments such as "sales", "service", "roadside assistance", or "finance", which are the routing destinations in this example. The developer provides an example of a sentence for each of the routing destinations by entering the examples into the example planner 110. For example, the developer can enter the example sentences "I want to buy a car" (associated with sales), "I need an oil change" (associated with service), and "I have a flat tire" (associated with roadside assistance). The developer may provide a few examples for the most frequently called destinations.

At step 204, the examples can be added to the NLU database 130. The validation unit 120 can verify the association of the the examples with their routing destinations. The examples provided by the developer with the associated routing destinations can be added as marked example sentences to an NLU sentence database 130 which may already contain general corpora of sentences. The validation unit 120 can take the examples provided by the developer and ensure that the NLU models can properly interpret each example sentence. The example planner 110 submits examples that fail testing within the validation unit 120. For example, within a call routing application, the proper interpretation is assignment to the correct routing destination. If the example fails to make the correct assignment, the example is added to the NLU database for learning an association for making a correct interpretation. The NLU application is sufficiently capable of interpreting the example if it passes the validation unit 120 test.

At step 206, the system 100 can build NLU models. For example, referring to FIG. 1, the training unit 122 builds a NLU model from all sentences in the NLU database including examples that failed, where the process of building captures the statistics of the marked example sentences within the NLU sentence database. The NLU model forms new rules during the building process to learn an association between the sentences in the NLU database and the routing destination. This enables the NLU model to learn to interpret the failed examples correctly. The statistics associated with the identified NLU model interpret the caller's request and connect the caller to the correct routing destination.

At step 208, the system 100 can validate NLU models as mentioned. For example, referring to FIG. 1, the developer 101 enters an example sentence into the example planner 110 which the validation unit 120 evaluates. If the NLU models within the validation unit do not produce a correct routing destination with respect to the example sentence, the example planner 110 adds the example sentence to the NLU database 130. The developer can optionally specify a count to increase the number of presentations of the example during training. The developer increases the frequency of example occurrence to reduce ambiguities between a frequently used example and its associated routing destination. If the NLU models do produce a correct routing destination with respect to the example sentence, the example planner 110 does not add the example to the NLU database 130. Notably, the validation unit 120 trains a set of NLU models to form associations between the examples and associated routing destinations for example sentences that fail. The training unit 122 teaches the NLU models to capture statistical information from sentence content of the marked examples, and biases the statistics to favor associations concerning the example or multiple occurrences of the example provided by the developer.

At step 210, a criterion can be measured to reveal the degree to which a NLU model has learned an association between an example and a routing destination for correctly interpreting the example. For example, referring to FIG. 1, the testing unit 124 measures a discrepancy between an example and routing destination during testing. The example and expected outcome constitute an example sentence which the example planner 110 adds to the NLU database 130. The testing unit 124 first tests the example to determine if the NLU models identifies a correct routing destination. If the NLU models can identify a correct routing destination the example planner 110 does not add the example to the NLU database 130, as there is no need to make any corrections for examples that are working properly. If the validation unit 120 cannot identify a correct routing destination, the example planner 110 adds the failing examples to the NLU database and trains the NLU models. The training unit 122 trains the NLU models to ensure the NLU models can properly interpret the example sentence.

During training, the validation unit 120 gathers statistics from the sentences and words in the examples to form associations within the NLU database 130. The NLU models produce a measure of similarity between the examples and associated routing destinations with regard to statistics within the NLU application 149. The measure of similarity provides a criterion for which correct routing destinations are measured. For example, the training unit 122 applies weights to the grammar rules to bias the NLU models in favor of frequently called destinations or the example sentences provided by the developer 101 during generation of the NLU application. The testing unit 124 evaluates the interpretation of the NLU models to the trained example sentences, and if the criterion is not met, the training unit 122 continues to bias the NLU models until the criterion is satisfied.

At step 212, the NLU models can be corrected if the criterion is not met. For example, referring to FIG. 1, the testing unit 124 evaluates a discrepancy for a developer example. A discrepancy can exist when the testing unit 124 incorrectly interprets the example sentence. The testing unit 124 marks the example within the NLU database 130 for further biasing. The biasing unit 126 evaluates the discrepancy and sends the discrepancy with the example and incorrect routing destination to the training unit 122 for further training. The training unit 122 uses the discrepancy with the marked example sentence to further bias the NLU models to strengthen an association between the example and the correct routing destination.

At step 214, if the criterion is met, the system can stop training the NLU models. For example, a developer 101 can enter an example that already has an associated routing destination. The developer 101 can enter numerous routing examples each with their own set of routing destinations. The example planner 110 enters this information into the NLU database 130 if the examples are not properly interpreted during testing. The validation unit 120 continues to train the examples and test the examples to ensure a high likelihood of correct interpretation. The biasing unit 126 controls the amount of biasing to prevent the NLU models from incorrectly interpreting sentences that were already correctly interpreted before the biasing. For example, the training unit 122 can over-train the NLU models, which can lessen the interpretation capabilities of the models. With too much training, the NLU models can be over-biased, reducing the generalizations of the discriminant functions within the NLU models and forcing them to reduce their variance—an undesirable outcome. Accordingly, the example planner 110 adds examples to the NLU database 130 to increase the statistical variance, thereby providing focused generalizations that are mode content specific. When the validation unit 120 determines the NLU models that can accurately interpret the example, and provide the correct interpretation, the training unit 122 stops training.

Figure 3:
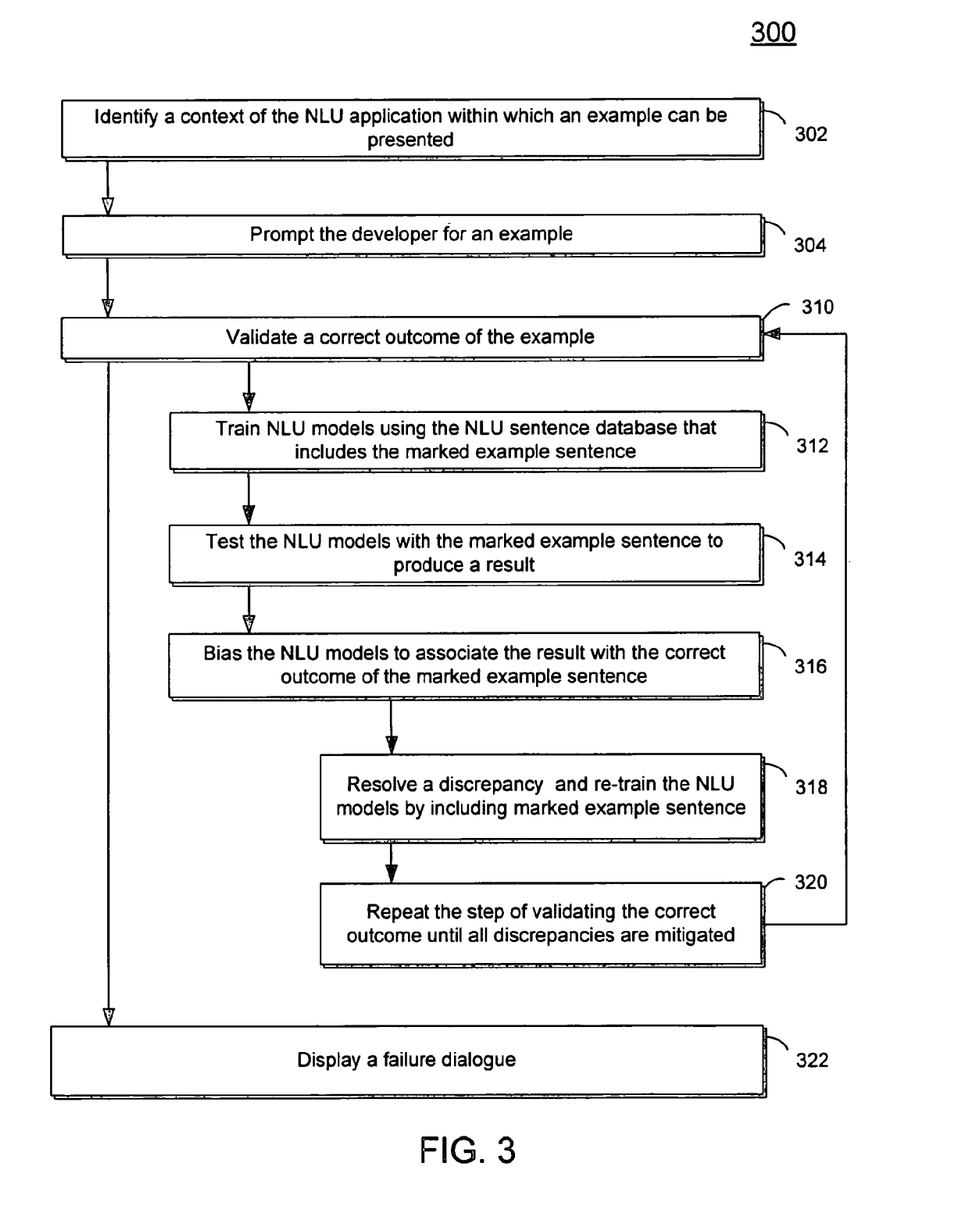
FIG. 3 is a flowchart illustrating a method for creating and conveying an example prompt in accordance with an embodiment of the inventive arrangements disclosed herein.

Referring to FIG. 3, a method 300 for creating an example prompt is shown. When describing the method 300, reference will be made to FIG. 1, although the method can be practiced in any other suitable device or system. Moreover, the steps of the method 300 are not limited to the particular order in which they are presented in FIG. 3. The inventive method can also have a greater number of steps or a fewer number of steps than those shown in FIG. 3.

At step 302, a context of the NLU application within which an example can be presented can be identified. For this example, an auto dealership NLU system may receive calls that can be routed to various departments.

At step 304, the system 100 can prompt the developer for an example. Referring to FIG. 1, the example planner 110 presents a prompt to the developer for entering an example. For example, in the case of the auto dealership NLU routing application, the developer can enter the examples "I want to buy a car" (associated with sales), "I need an oil change" (associated with service), and "I have a flat tire (associated with roadside assistance). Also, the NLU application development environment or NLU software programming environment 127 may contain drag and drop routing destinations which a developer may use to enter the examples. The developer 101 can build the NLU application using this NLU application development environment. The developer 101 can write an NLU program on software in a software programming environment. The software programming environment can include application interfaces to information sources. For example, the software programming environment could link in example sentences from an external source 102. The developer can enter program commands to copy the example sentences, or the developer can use drag and drop features for entering the examples into the application.

The developer example can be added to a NLU sentence database if the example fails to interpret the correct routing destination. For example, referring to FIG. 1, the testing unit 124 evaluates an example provided by the developer 101. The testing unit 124 first determines if the NLU models can correctly interpret the example, where the test of interpretation is whether the NLU models can associate the example with the correct routing destination. If the NLU models fail to interpret the example, the example planner 110 adds the example to the NLU database 130. If the NLU models correctly interpret the example, and the correct routing destination is selected for the example, the example planner 110 does not add the example to the NLU database.

For example, the developer can enter the example sentence "I need an oil change" that is associated with a 'service' routing destination into the example planner 110. The testing unit 122 then processes the sentence "I need an oil change" to evaluate what routing destination the NLU models associate with the sentence. If the NLU models produce a routing destination result such as 'carwash', the testing unit 124 determines that the NLU models did not correctly interpret the sentence. Accordingly, the example planner 110 adds the example sentence to the NLU database with an association to the correct routing destination. The NLU models, during training, require that a target routing destination be associated with the example sentence. Having incorrectly interpreted the example, the NLU models need to know what should be the correct association. For example, the NLU models can be but not limited to Hidden Markov Models or Neural Networks that learn associations by minimizing a mean square error or other criterion. The mean square error or other criterion reveals the degree of association between the example and the expected outcome (e.g., the routing destination) which is provided by the validation unit 120.

Referring to FIG. 1, the example planner 110 marks the example and routing destination within the NLU sentence database to produce a marked example sentence. The marking identifies the example as one that should be validated and potentially be used for training to improve the accuracy of the NLU model on these examples. In particular, using these marked examples in the training improves the statistical modeling accuracy by effectively increasing their statistical weighting during training. Accordingly, this biasing increases the association of the example with the correct routing destination.

At step 310, a correct outcome of the example can be validated. One aspect of the present invention includes building the NLU models to validate a correct routing destination. Referring to FIG. 1, the training unit 122 trains the NLU models using the NLU sentence database, which includes the marked example sentences. The testing unit 124 tests the NLU models with the marked sentences to produce a result and the biasing unit 126 biases the NLU models to reinforce the association of the example with the correct routing destination based on the result. In particular, the validation unit 120 ensures that the NLU application learns an association between the example and associated routing destination created by the developer during the development of the NLU application. In one arrangement, validating a correct outcome can include testing the NLU application with the example during development.

At step 312, the NLU models which include the marked example sentences can be trained. For example, the training unit 122 trains the NLU models using the NLU sentence database with the marked example sentences. At step 314, the NLU models can be tested to ascertain whether the model produces a correct outcome. In one arrangement, the testing unit 124 assesses performance of the NLU models using the example as an input. The biasing unit 126 updates the NLU model to reinforce the association between the example and the correct outcome (i.e., routing destination). For example, the biasing unit 126 measures a degree of correlation between the example and the provided routing destination, and biases the NLU model. For instance, the developer can enter many examples into the developer example prompt, each with an associated set of routing destinations during development. During testing, the NLU models ranks a list of routing destinations based on the degree of correlation from the training process. The NLU application selects the routing destination with the highest correlation to the example. The correlation value represents the level of confidence within the NLU models for producing the correct routing destination.

At step 318, a discrepancy can be resolved between the result and the correct outcome, and the NLU models can be re-trained. The biasing unit 126 resolves this discrepancy by requesting the training unit 122 to re-train the NLU model by including the marked example sentences. The training unit 122 uses these marked example sentences to reinforce the association between the marked example sentences and the expected routing destination.

In one arrangement, the biasing unit 126 concludes operation by a triggering of a stop condition which prevents further biasing of the trained NLU model. For example, the triggering can be initiated by a developer or a software process during generation of the NLU application. The stop condition can also be a threshold of corrected sentences to newly broken sentences. For example, referring to FIG. 1, the biasing unit 126 corrects broken sentences generated by the testing unit 124. The biasing unit 126 passes the corrected sentences to the training unit 122, which strengthens the association of the example sentence to the correct routing destination. In another arrangement a display unit 112 shows a failure dialogue 169 coupled to the validation unit 120 and presents an error entry. The failure dialogue 169 identifies the response with the correct outcome placed in a list of error entries to be resolved. The NLU application development environment 127 presents the failure dialogue 169 to the developer 101.

At step 320, the step of validating the correct outcome (such as routing destination) can be repeated until all discrepancies are mitigated. Referring to FIG. 1, the testing unit 124 identifies a discrepancy during the development of the NLU application. The training unit 122 includes corrected sentences in the training to reinforce the association between the example and the routing destination. The biasing unit 126 sets a threshold and initiates the stop condition when the threshold of corrected sentences to newly broken sentences is reached. As another example, the biasing unit 126 triggers a stop condition with a threshold number of maximum iterations, where the validation unit 120 performs at least one iteration which is considered the validating of at least one correct outcome.

At step 322 a failure dialogue presents an error entry identifying the response and the correct outcome placed in a list of error entries to be resolved can be displayed. For example, referring to FIG. 1, the NLU application development environment 127 presents a failure dialogue 169 to disclose the outcome of the interpretation of the developer's examples. The failure dialogue 169 provides feedback to the developer by presenting a list of entry errors where the NLU models could not properly interpret the developer's example or set of examples. For example, a developer may enter in a sentence which did not produce a correct routing destination. The NLU models may not be able to predict the correct routing destination even with sufficient training. Accordingly, the failure dialogue 169 presents the results of the validation to the developer 101, to inform the developer of the NLU model's performance.

The developer 101 may elect to use another example instead of the example that received a poor performance rating in view of the failure dialogue 169. The failure dialogue 169 serves to assist the developer 101 in entering examples which the NLU models can correctly interpret for providing an unambiguous and correct interpretation. The failure dialogue 169 can present errors in a ranked order of probability. For example, the validation unit 120 processes a batch of examples sentences with each sentence having a confidence score to each of the available routing destinations. For each sentence within a batch, the NLU model produces a confidence score describing a probability of the example being associated to the routing destination.

The failure dialogue 169 presents a confidence score for each routing destination in a ranked order. For example, the developer can enter six sentences all under a common routing destination of N total destinations possible. The failure dialogue 169 returns an N-best list for each of the six examples revealing the confidence scores; and which should list the correct routing destination at the top of the list if the examples are accurately interpreted. The failure dialogue 169 retrains examples which do not produce the correct association, and if it cannot produce the correct association, the confidence scores in the list of errors show the developer that the system considers the example one that the NLU model cannot interpret correctly. Accordingly, the developer 101 examines the list of errors to determine which examples resulted in an incorrect routing destination. The developer 101 removes these incorrect entries and/or substitutes in new entries to ensure that all examples provided to a caller within a help message 147 are interpreted correctly.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for facilitating development, in a natural language understanding (NLU) application development environment, of an NLU model associated with an NLU application, the system comprising:
    at least one processor;
    an NLU database storing information used for training one or more NLU models;
    at least one non-transitory computer-readable storage medium encoded with instructions that, when executed by the at least one processor, cause the at least one processor to perform a method comprising:
    obtaining, from a developer of the NLU application, at least one expected user entry and a corresponding desired routing destination;
    adding the at least one expected user entry and the corresponding desired routing information to the NLU database;
    applying the NLU model to the at least one expected user entry to determine whether the NLU model associates the at least one expected user entry with the desired routing destination;
    when it is determined that the NLU model associates the at least one expected user entry with the desired routing destination, selecting the at least one expected user entry for presentation to a user during a help prompt of the NLU application as an example of input the user could provide to be routed to the desired routing destination;
    when it is determined that the NLU model does not associate the at least one expected user entry with the desired routing destination, accessing training data in the NLU database, the training data including the at least one expected user entry and the corresponding desired routing information, and
    training the NLU model using the training data accessed in the NLU database to associate the at least one expected user entry with the desired routing destination.

2. The system of claim 1, wherein the applying comprises:
    interpreting, via the NLU model, the at least one expected user entry to determine an actual routing destination for the at least one expected user entry; and
    determining whether the NLU model associates the at least one expected user entry with the desired routing destination by comparing the actual routing destination to the desired routing destination.

3. The system of claim 2, wherein, when it is determined that the NLU model does not associate the at least one expected user entry with the desired routing destination, the method further comprises:
    presenting a failure dialog to the developer of the NLU application indicating that the actual routing destination does not match the desired routing destination.

4. The system of claim 1, wherein training the NLU model to associate the at least one expected user entry with the desired routing destination comprises:
    training the NLU model in accordance with a specified training frequency and/or a statistical weighting for the at least one expected user entry.

5. The system of claim 1, wherein when it is determined that the NLU model does not associate the at least one expected user entry with the desired routing destination, the method further comprises:
    adding the at least one expected user entry to an NLU entry data set associated with the NLU model; and
    training the NLU model using the data in the NLU entry data set.

6. The system of claim 1, wherein the method further comprises:
    presenting said at least one expected user entry in a help message of said NLU application as example input to the NLU application.

7. The system of claim 6, wherein the help message comprises a preamble followed by the at least one expected user entry.

* * * * *